United States Patent
Gould et al.

[15] 3,680,180
[45] Aug. 1, 1972

[54] LOW-PROFILE WIDE RANGE PIPE CLAMP

[72] Inventors: Wallace E. Gould; Peter N. Cassimatis, both of Decatur, Ill.

[73] Assignee: Mueller Co., Decatur, Ill.

[22] Filed: Feb. 25, 1971

[21] Appl. No.: 118,928

[52] U.S. Cl. ...................24/279, 138/99, 285/197
[51] Int. Cl. ..........................B65d 63/02, F16l 55/16
[58] Field of Search ........138/99; 285/197, 198, 199; 24/279, 280, 281, 282

[56] References Cited

UNITED STATES PATENTS

| | | | |
|---|---|---|---|
| 3,089,212 | 5/1963 | Graham et al. | 138/99 X |
| 3,151,632 | 10/1964 | Risley et al. | 138/99 |
| 3,173,450 | 3/1965 | Halterman | 138/99 |
| 3,175,267 | 3/1965 | Graham | 138/99 X |
| 3,472,537 | 10/1969 | Paterson | 138/99 X |
| 3,487,856 | 1/1970 | Turner et al. | 138/99 |

Primary Examiner—William R. Cline
Attorney—Cushman, Darby & Cushman

[57] ABSTRACT

A low-profile pipe clamp for use in encircling a pipe or main as a pipe repair clamp or a service side outlet clamp. The pipe clamp comprises a flexible band of sheet metal or the like having a gasket liner which seals with a section of the exterior of the pipe, the band being split and made of at least one section and having at least a pair of lugs attached to each of its opposed end portions. Bolts draw the lugs together and cause the band to tightly encircle the pipe. Means are provided for causing the clamp lugs to positively rock in an opposite sense so as to draw the band up faster than the nut is taken up on the bolt and thus increase the sealing pressure for the same bolt torque. Additional means are provided to reduce bending strains in the bolt when the nuts are taken up so that the necessary torque can be applied to the bolts.

12 Claims, 5 Drawing Figures

PATENTED AUG 1 1972　　　　　3,680,180

INVENTORS
WALLACE E. GOULD
PETER N. CASSIMATIS

BY Cushman, Darby & Cushman
ATTORNEYS

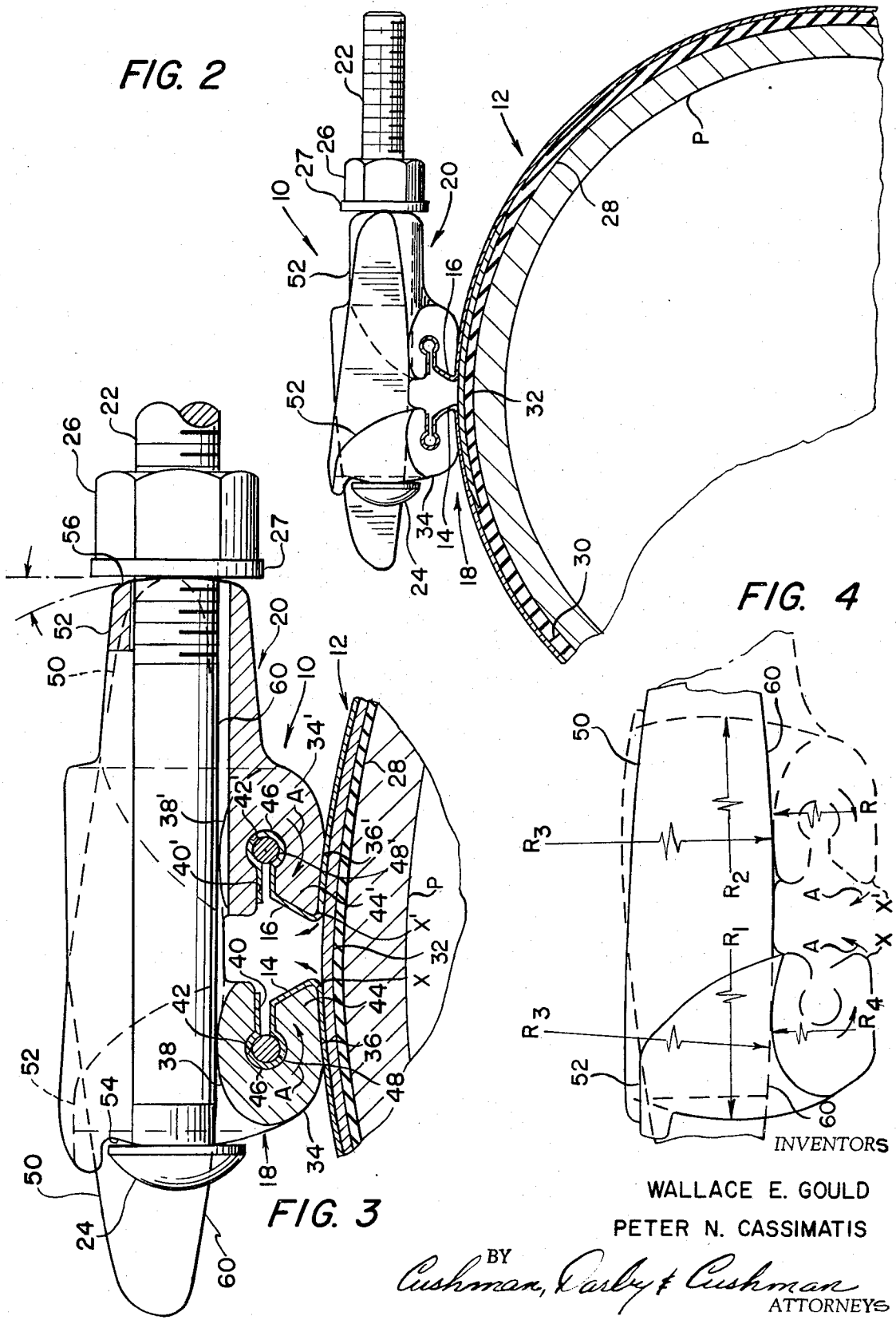

LOW-PROFILE WIDE RANGE PIPE CLAMP

The present invention relates generally to improvements in low-profile pipe clamps of the type having a split flexible band means with at least one pair of spaced end portions having a pair of rigid lugs attached thereto and arranged to be drawn together by bolt means. More particularly, the present invention relates to an improvement in such clamps wherein the lugs are each provided with fingers for cooperating with the other lug to cause a positive controlled rocking of the lugs so that when the lugs are drawn together the band means encircling the pipe is drawn up faster than the take up of the nuts on the bolts thus improving sealing by providing higher sealing pressures at the same bolt torques. Additionally, the pipe clamp of the present invention permits higher bolt torques without exceeding recommended strains in the bolts as the bolts are permitted to move relative to the rocking lugs.

BACKGROUND OF THE INVENTION

Pipe clamps of the type utilizing split flexible bands for encircling the pipe have heretofore been provided with lugs attached to the spaced band ends, the lugs being drawn together by bolts to cause the band and its gasket to tighten about the pipe. In some prior arrangements the lugs have not been provided with fingers and consequently such lugs have rocked toward one another and have caused the end portions of the band to dig into the usual gap bridge provided beneath the band ends. This type of arrangement resulted in high bending strains in the bolts thus restricting the amount of bolt torque and the amount of sealing pressure exerted against the surface of the pipe. Even if the lugs of this type of clamp were provided with means to permit the bolt head and the nut to slide relative to the lugs during tightening, there was still excessive local pressure applied to the gap bridge or to the pipe exterior and this limited or hindered the sealing pressure applied by the clamp to the pipe.

Efforts were made to control the rocking of the lugs by providing a fulcrum point located outwardly of the bolt axis and this was done by providing the respective lugs with fingers or projections which engaged one another to provide the fulcrum point. Such lugs were inherently weak as the fingers or projections, which extended radially outwardly from the lugs and engaged at their ends, assumed too much of the load and thus strains were developed therein. Additionally, this type of pipe clamp was a "high-profile" design rather than a "low-profile" design thus making the overall clamp bulky and cumbersome and the lugs were expensive and difficult to manufacture.

With the advent of the low-profile pipe clamp, the fingers on the lugs were arranged to oppose bearing surfaces on the other lug but the bearing surfaces between the lugs and the fingers were purposely made planar so that the lugs, when drawn towards one another, had substantially rectilinear movement. This was done with the purpose of trying to reduce bending strain in the bolts. However, such arrangements, because of the curvature of the pipe, still encountered maximum bolt strain with the band ends digging into the gap bridge or pipe. Thus, this arrangement somewhat limited the sealing pressures which could be applied by the flexible band means to pipe.

Typical prior art arrangements of pipe clamps may be found in the following U.S. Pat. Nos.: 429,979 to O. Thum, June 10, 1890; 2,713,352 to E.H. Schustack, July 19, 1955; 2,826,799 to E.H. Schustack, Mar. 18, 1958; 2,834,086 to T.L. Smith et al., May 13, 1958; 2,977,995 to F.K. Walpole Apr. 4, 1961; 2,980,143 to F.F. Harris, Apr. 18, 1961; 3,089,212 to T.A. Graham et al., May 14, 1963; 3,151,632 to R.E. Risley et al., Oct. 6, 1964; 3,183,938 to T.L. Smith et al., May 18, 1965; Re 26,051 to H.L. Hoke, June 28, 1966.

BRIEF SUMMARY OF THE INVENTION

The present invention involves an improved low-profile pipe clamp of the type having split flexible band means for encircling a pipe, spaced opposed end portions of the band means being drawn together by a pair of lugs having at least one bolt there between, each of the lugs further having fingers extending toward the other lug and engaging the other lug to provide a controlled positive rocking of the lugs as they are drawn together. The controlled rocking of the lugs causes the band end portions to move or pivot away from the pipe thereby causing the flexible band means to be taken up faster about the pipe than nut travel on the bolt so as to increase sealing pressures for particular bolt torque. This is accomplished while reducing bending strains in the bolt thereby permitting higher bolt torques for a particular size bolt or permitting the use of smaller bolts at the same bolt torques. Additionally, the improved pipe clamp of the present invention causes the end portions to pull away from the pipe as the lugs are drawn toward one another, thereby eliminating the tendency of the band ends to dig into the pipe or a gap bridge when such a gap bridge is used.

In order to accomplish the above advantages in the pipe clamp of the present invention, each of the fingers of a pair of cooperating lugs is provided with a convexly curved radially inner surface which cooperates with a convexly curved radially outer surface on the other lug so that the lugs rock in an opposite sense to each other on rolling axes with the free ends of the fingers moving away from the pipe. This is coupled with the provision of providing a convexly curved bearing surface between the bolt head and one lug and a convexly curved surface between the nut and the other lug to reduce the bending strain in the bolt as the bolt head and nut can slide relative to their respective rocking lugs. Since the fingers of the lugs of the pipe clamp of the present invention have their axes lying generally in the same plane as the axis of the bolt which is intermediate the same, the clamp is compact and may be easily wrapped if desired. Such lugs are easy to cast and the fingers of the same can be provided with sufficient strength necessary for obtaining higher sealing pressure by the band means.

BRIEF DESCRIPTIONS OF THE DRAWINGS

FIG. 2 is a fragmentary end elevational view of the pipe clamp of the present invention installed on a pipe, the pipe being shown in section along with the band means;

FIG. 3 is an enlarged fragmentary view similar to FIG. 2 but taken on the section line 3—3 of FIG. 1;

Figure 5:
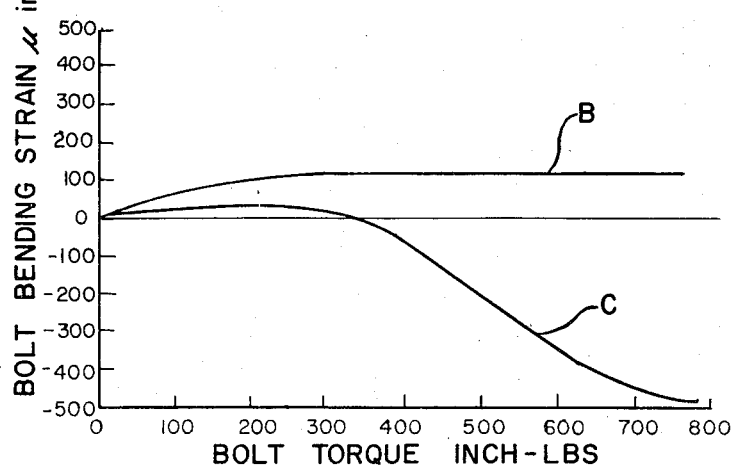

FIG. 4 is a schematic view illustrating the various radii of curvature on the surfaces of the lugs necessary to achieve the results of the pipe clamp of the present invention; and FIG. 5 is a graph comparing the bending strain in the bolts to the torque applied to the bolts between a pipe clamp of the present invention and a similar low-profile pipe clamp designed to have rectilinear movement of the lugs as the lugs are drawn together.

DETAILED DESCRIPTION OF THE INVENTION

Figure 1:
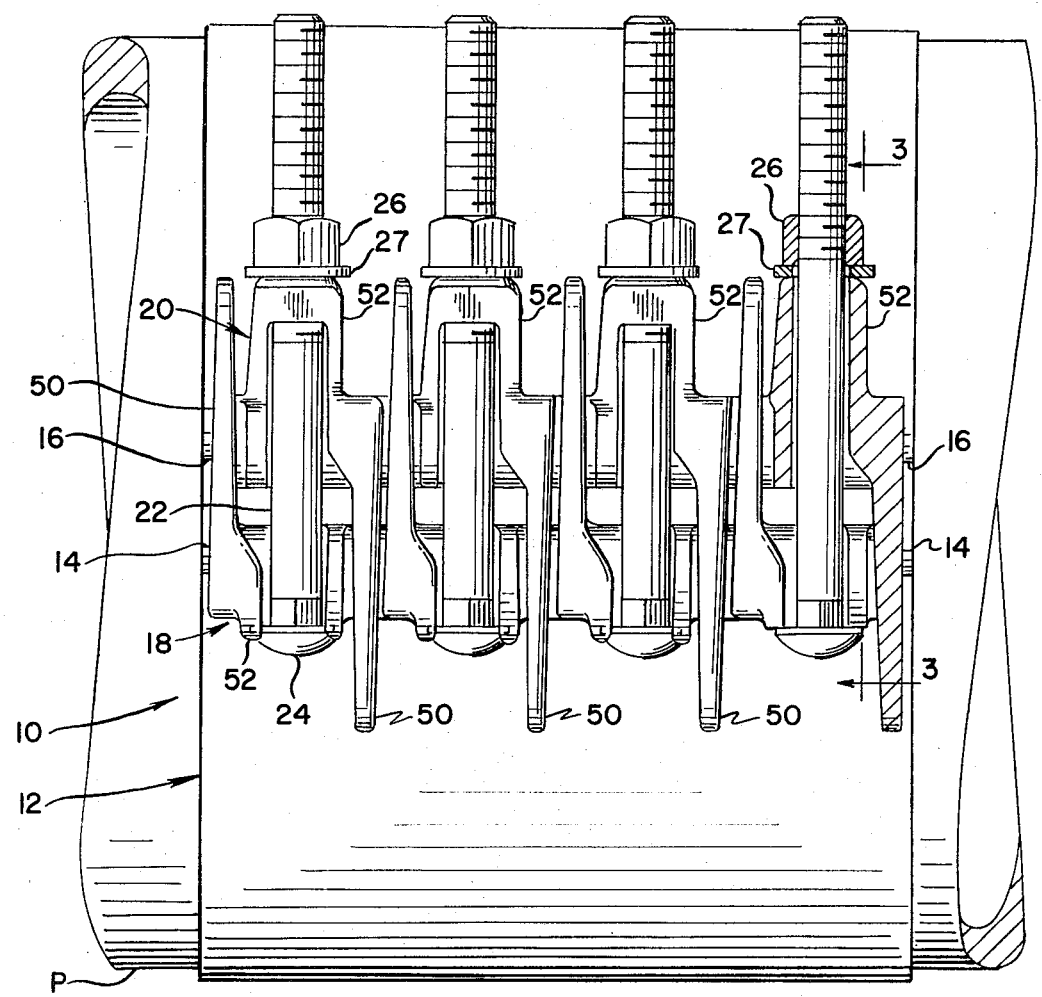
FIG. 1 is a top plan view of the pipe clamp of the present invention with a portion of one of the pair lugs shown in section.

Referring now to the drawings wherein like character or reference numerals represent like or similar parts; and in particular to FIG. 1, there is shown a low-profile pipe clamp of the present invention, the same being generally designated at 10. The pipe clamp 10 encircles a pipe or main and may be of the type for repairing holes or cracks in pipes or it may be of the type provided with a service side outlet to which a service pipe is connected such as disclosed in U.S. Pat. No. 3,467,943 issued Sept. 16, 1969 to Phillip N. Adams and assigned to the same assignee Mueller Co., Decatur, Illinois.

The low-profile pipe clamp 10 includes a split flexible band means 12 which completely encircles the pipe P, the band means 12 being provided with bent-back spaced end portions 14 and 16 arranged to be fixedly secured to a pair of lugs 18 and 20. Tightening means comprising bolts 22 having bolt heads 24 and nuts and washer 26 and 27 respectively extend between the lugs 18 and 20 and are arranged to draw the lugs toward one another so as to cause the band means 12 to be drawn tightly about the pipe and thereby cause a gasket member 28, carried on the interior of the band means 12 to tightly press against the pipe wall to provide a fluid tight seal therewith.

The band means 12 is made from a suitable rust resistant non-corrosive sheet metal material such as bronze or stainless steel and is generally curved to provide a generally semi-cylindrical portion having a radius of curvature which permits it to be flexed about a pipe of a size falling within a particular range of sizes. For a small diameter pipe size range, the split flexible band means 12 may be made from a single section of sheet material and, thus, would only have a pair of opposed spaced end portions which would necessitate only a single pair of lugs 18 and 20 for drawing the same about a section of the pipe P. On the other hand, if the pipe clamp 10 is intended to be used with a large diameter pipe size range, then the band means is made up of at least two arcuate sections of sheet material and each opposing pair of spaced end portions 14 and 16 is provided with a pair of lugs 18 and 20 for drawing the band means tightly about the pipe. The prior art mentioned at the outset of this specification discloses both the single section and the multi-section pipe clamps and to that extent is incorporated by reference herein. Consequently it is not believed necessary to discuss or disclose in the drawings single section or multi-section pipe clamps in more detail and it will be understood by those skilled in the art, the appended claims are intended to cover either of these arrangements.

The gasket member 28, which is made of an elastomeric material such as rubber, neoprene, or the like, is bonded by a suitable adhesive or bonding material to the internal surface of the split flexible band means 12 and it may have one end which projects beyond the area where the band means 12 is split so that its joint line between two adjacent ends does not occur in this area. The joint line indicated at 30 (FIG. 2) may be of any suitable shape or configuration such as inter-locked fingers or tapered sections so that the gasket member 28 completely encircles and seals against the exterior cylindrical surface of the pipe P. As shown in FIGS. 2 and 3, a gap bridge or spanner member 32 spans the joint or space between the opposed lugs 18 and 20 and the end portions 14 and 16, the gap bridge being a metal shim extending longitudinally of the pipe P and being arcuate in radial section and of a selected width sufficient for the gap bridge to underlie each lug between the end portions 14 and 16 of the band means 12 and the gasket 28. The gap bridge 32 is usually provided in split pipe clamps of this type to prevent the gasket member 28 from extruding between the spaced end portions 14 and 17 as the lugs are drawn together. Additionally, the gap bridge 32 provides a hard surface for the band means 12 to slide on as the lugs 18 and 20 are drawn together and additionally it distributes any load caused by the lugs to be evenly distributed to the gasket 28.

Referring now in particular to FIGS. 2 and 3, the rigid lug 18 is provided with a body member 34 which is elongated and extends in a lengthwise direction of the pipe P when the pipe clamp 10 is placed on the pipe. The body member 34 has a radially inner surface 36 and a radially outer surface 38 which will be discussed in more detail later in the specification. Body member 34 is provided with a longitudinally extending slot 40 in its side which faces the lug 20, the slot communicating at its inner end with a longitudinally extending substantially circular cored bore 42. The opposing lug 20 has a similar elongated body member 34' with a radial inner surface 36' and a radial outer surface 38'. Likewise the body member 34' is provided with a longitudinally extending slot 40' communicating at its inner end with a longitudinally extending substantially circular cored bore 42'. The bent back part of the end portions 14 and 16 of band means 12 are each provided with a looped end 46 and thus the band end portions are secured to the lugs by sliding their looped ends 46 axially into the respective cored slots 40 and 40'. A rod 48 is then forced into the looped ends 46 and this positively retains the end portions 14 and 16 to the lugs 18 and 20 respectively.

Each rigid lug 18 and 20 has at least one tangentially projecting finger 50 integrally carried on the radially outer surface 38 and 38' of each body member 34 and 34'. As shown in FIG. 1 each lug 18 and 20 may be provided with a plurality of such fingers longitudinally spaced from each other, the number of fingers depending upon the size of the pipe clamp and the diameter of the pipe P on which it is to be used. The tangentially projecting fingers 50 of each lug 18 and 20 are arranged to bear against the radially outer surface of the other opposing lug and as will be explained in more detail later in the specification, these fingers have a particular configuration as does the radially outer surface of the body members so that there is a positive controlled rocking as the lugs are drawn together.

The body members 34 and 34' of lugs 18 and 20 respectively are also each integrally provided with at least a pair of bolt receiving projections 52 extending radially outwardly from the outer surface of each lug. The pair of bolt receiving projections 52 of lug 18 are open and define a slot for receiving the square portion of the bolt 22 immediately below the bolt head 24 and thus the bolt cannot turn when the nut is tightened. The bolt receiving projections 52 of the lug 20 have a bridged over portion forming a hole and projecting tangentially in an opposite direction to the fingers 50 for receiving the nut end of the bolts 22. Referring specifically to FIGS. 3 and 4, it will be noted each bolt receiving projection 52 of the lug 18 is provided with a convexly curved bearing surface 54 remotely facing with respect to the finger which engages the underside of the bolt head 24 and this permits tangential sliding of the bolt head on the same. The surface 54 has a radius R1 which has an axis extending parallel to the axis of the longitudinally extending body member 34 and the pipe P. Although the convexly curved surface 54 is shown as semi-cylindrical, it will be appreciated that the same can be domed shaped or semi-spherical. Conversely, this convexly curved bearing surface could be provided on the under surface of the bolt head 24 rather than on the bolt receiving projections. Each of the bolt receiving projections 52 of the lug 20 is provided with a similarly convexly curved bearing surface 56 having a radius of curvature R2 which also has an axis parallel to the longitudinal axis of the body member of lug 20 and parallel to the axis of the pipe P. This surface 56 may likewise be semi-cylindrical or domed shaped semi-spherical. The bearing surface 56 operatively bears against the nut 26 and since the hole provided in the bridged over portion of the bolt receiving projection 52 of lug 20 has an opening larger than the diameter of the bolt 22, the nut is capable of operatively sliding tangentially on the surface 56 when the lugs rock.

As mentioned earlier in the specification the fingers 50 of the lugs 18 and 20 cooperate with the radially outer surfaces 38 and 38' respectively to provide a positive controlled rocking of the lugs when the lugs are drawn towards one another to tighten the band means 12. In this respect, the fingers 52 of lugs 18 and 20 respectively are each provided with convexly curved radially inner surfaces 60, the surfaces 60 each having a radius of curvature R3 with an axis lying parallel to the axis of the pipe P and to the axis of the respective longitudinally extending body members 34 and 34'. Additionally, the radially outer surfaces 38 and 38' of lugs 18 and 20 respectively are also convexly curved, each having a radius of curvature R4 with an axis parallel to the axis of the pipe P and the respective body members 34 and 34'. By providing a convexly curved surface on the radially inner surface 60 of the fingers 50 which cooperates with the convexly curved radially outer surface of the opposed lug, the lugs 18 and 20, when drawn together, rock about spaced rolling axes in an opposite sense with the respective free ends of the fingers 40 moving outwardly and generally away from the pipe P. This controlled rocking of the lugs 18 and 20 causes the points X and X' on the flanges 44 and 44' to rock upwardly toward one another carrying with them the band end portions 14 and 16 which are wrapped around the same and, thus, the band end portions 14 and 16 cause the band means 12 to be taken up faster about the pipe P then nut travel on the bolt 22. This action results in higher sealing pressures being obtained by the gasket member 28 on the surface of the pipe P for the same torque as previously applied to bolts of lug members having rectilinear movement. Consequently the pipe clamp 10 of the present invention can be utilized to repair pipes subjected to higher fluid pressures than those clamps of the prior art. Another advantage in rocking the lugs 18 and 20 in the specific direction indicated by the arrows A (FIGS. 3 and 4) is that the end portions 14 and 16 where they wrap around the flanges 44 and 44' do not dig into the gap bridge or spanner member 32 but actually move away from the gap bridge in the areas of the points X and X'. This eliminates gap bridge buckling while providing improvement sealing.

Bending strains develop in the bolts of prior art pipe clamps which have planar or straight surfaces on the fingers and the coacting surfaces of the opposing lugs because such lugs do not have true rectilinear motion when tightened. In the present invention, bending strain in the bolts 22 is substantially reduced by using the curved bearing surfaces 54 and 56 for the bolt head 24 and nut 26 respectively. This permits use of the rocking lug concept as the bolts are allowed to assume their most desirable position relative to the two lugs and are under tension axially of the same rather than having loads transverse of their axes. In other words, the bolt head 24 and the nut 26 can slide tangentially on these curved surfaces and, thus, there is not the build-up of bending strain in the bolt and this permits higher bolt torques without exceeding recommended limits of bolt strain.

Referring to FIG. 5, there is shown a graph comparing a 12 inch low-profile pipe clamp of the present invention to a similarly constructed 12 inch low-profile pipe clamp designed for generally rectilinear movement of the lugs toward one another. The graph plots the average bending strain in $\mu$ in./in. versus bolt torque applied in inch pounds. The curve B represents the low-profile clamp of the present invention whereas the curve C represents the prior art low-profile clamp. As will be noted, torque applied to the bolts in the clamp of the present invention reached a maximum bending strain at a torque of about 300 inch pounds and maintained this strain steadily up to a torque of about 800 inch pounds. On the other hand, the prior art low-profile pipe clamp only reached about 30 $\mu$ in./in. at a torque of about 175 inch pounds and then the bolts began to fail because of the bending strain and at a torque of about 350 pounds the bolts started to bend. From a comparison of the two curves, it shows the pipe clamp of the present invention is capable of utilizing higher bolt torques and thus applying higher sealing pressures on the pipe.

The terminology used throughout this specification is for the purpose of description and not limitation, the scope of the invention being defined in the claims.

What is claimed is:

1. A low-profile pipe clamp for encircling a pipe, said pipe clamp comprising: a split flexible band means including at least one pair of circumferentially spaced bent back end portions arranged to be drawn towards each other; a pair of rigid lugs attached to said end portions and arranged to draw the pair of end portions together as the band means is tightened about the pipe, each of said lugs including an elongated body member extending in a lengthwise direction of the pipe, each body member having a radially inner surface and a radially spaced outer surface, at least one tangentially projecting finger carried on the outer surface of each body member and having a radially inner surface adapted to engage the radially outer surface of the body member of the other said lug, said radially inner surface of said finger and said radially outer surface of the body member of the other said lug upon which it engages defining bearing surfaces when said lugs are drawn together and at least one of said bearing surfaces being curved on an axis generally parallel to the axis of the pipe wherein said lugs when drawn together rock about spaced axes in opposite directions away from each other, a bolt receiving projection extending radially outwardly from the outer surface of each of said lugs for retaining a bolt having a head and extending between said lugs, and a nut received on said bolt, said bolt receiving projection on one lug cooperating with the bolt head and said bolt receiving projection on the other lug cooperating with said nut, and bearing surfaces operatively between the bolt head and one bolt receiving projection and the nut and the other bolt receiving projection, said bearing surfaces operatively between the bolt head and the one bolt receiving projection having at least one surface curved on an axis parallel to the axis of the pipe and said bearing surfaces operatively between the nut and the other bolt receiving projection having at least one surface curved on an axis parallel to the axis of the pipe so that said bolt head and nut can slide relative to the bolt receiving projections when the nut is tightened and thereby reducing bending strains in the bolt when the lugs rock.

2. A low-profile pipe clamp as claimed in claim 1 in which said at least one of said bearing surfaces between said radially inner surface of said finger and the radially outer surface of said body member of the other lug is convexly curved.

3. A low-profile pipe clamp as claimed in claim 1 in which said bearing surfaces between the radially inner surface of said finger and the radially outer surface of the body member of the other said lug are both convexly curved.

4. A low-profile pipe clamp as claimed in claim 3 in which said at least one surface operatively between the bolt head and the one bolt receiving projection and the said at least one surface operatively between the nut and the other bolt receiving projection are both convexly curved.

5. A low-profile pipe clamp as claimed in claim 4 in which the convexly curved surfaces are on said bolt receiving projections of said body member.

6. A low-profile pipe clamp as claimed in claim 1 in which each body member has a longitudinally extending slot facing the slot in the other body member and defining a longitudinally extending flange, said band means extending beneath the radially inner surface of said body member and said bent back end portions being received in said slot, said flanges pivoting away from said pipe when said lugs are rocked so that said band means is taken up about said pipe faster than nut travel on said bolt when drawing said lugs together.

7. A low-profile pipe clamp for encircling a pipe, said pipe clamp comprising: at least a pair of lugs, each of said lugs including an elongated body member having a radially outer surface, a radially inner surface, and a flange edge portion extending from the inner radially inner surface and opposing a similar flange edge portion of the other lug, at least one tangentially projecting finger carried on the outer surface of each body member and having a radially inner surface adapted to engage the radially outer surface of the body member of the other said lug, a bolt receiving projection extending outwardly from the outer surface of each body member of said lugs, a bolt having a head and extending through the bolt receiving projections and a nut on said bolt for drawing the lugs together, said bolt having an axis lying between and generally in the same plane as the axes of said fingers; flexible band means for encircling the pipe, said band means having spaced end portions respectively extending beneath the radially inner surfaces and extending around the flange edge portion of each body member of said lugs, said end portions being respectively fixed to said body members; means operative when said lugs are being drawn together by tightening of the nut to cause each of said lugs to rock in an opposite sense on respective rolling axes extending generally parallel to the pipe axis with the free ends of the respective fingers moving away from the pipe and with the respective flange edges rotating away from the pipe whereby said band means is taken up about the pipe at a faster rate than nut travel on the bolt; and means to reduce build-up of bending strain in said bolt when said nut is tightened to draw said lugs toward each other.

8. A low-profile pipe clamp as claimed in claim 7 including an arcuate gap bridge extending beneath each of said lugs and covering the gap between the end portions of the same.

9. A low-profile pipe clamp as claimed in claim 8 in which said means to cause each of said lugs to rock includes providing the radially inner surface on each of said fingers with a convex curvature and providing the radially outer surface on each of said body members with a convex curvature, said convex curvature of said radially inner surface of each finger and said convex curvature of said radially outer surface of each body member being respectively curved on axes extending generally parallel to the pipe.

10. A low-profile pipe clamp as claimed in claim 9 wherein said means to reduce build-up of bending strain in said bolt includes providing each of said bolt receiving projections with convexly curved surfaces for respectively operatively engaging the bolt head and the nut thereby permitting the same to slide relative to the lugs when the lugs are rocked.

11. A low-profile pipe clamp as claimed in claim 10 in which said convexly curved surfaces on said bolt-receiving projections are domed shaped.

12. A low-profile pipe clamp as claimed in claim 10 in which said convexly curved surfaces on said bolt receiving projections each have a radius of curvature with an axis parallel to the axis of the pipe.

* * * * *